(12) United States Patent
Kim et al.

(10) Patent No.: US 10,266,732 B2
(45) Date of Patent: Apr. 23, 2019

(54) LIGHT BLOCKING ADHESIVE AND DISPLAY DEVICE INCLUDING THE SAME

(71) Applicant: SAMSUNG DISPLAY CO., LTD., Yongin-si, Gyeonggi-do (KR)

(72) Inventors: Youngdo Kim, Cheonan-si (KR); Soyoun Jung, Seoul (KR)

(73) Assignee: SAMSUNG DISPLAY CO., LTD., Yongin-si, Gyeonggi-do (KR)

( * ) Notice: Subject to any disclaimer, the term of this patent is extended or adjusted under 35 U.S.C. 154(b) by 3 days.

(21) Appl. No.: 15/609,366

(22) Filed: May 31, 2017

(65) Prior Publication Data

US 2017/0349793 A1    Dec. 7, 2017

(30) Foreign Application Priority Data

Jun. 1, 2016  (KR) .......................... 10-2016-0068372

(51) Int. Cl.
| | | |
|---|---|---|
| *C09J 133/10* | (2006.01) | |
| *C09J 133/14* | (2006.01) | |
| *C09J 183/08* | (2006.01) | |
| *C09J 133/04* | (2006.01) | |

(52) U.S. Cl.
    CPC ........... *C09J 133/10* (2013.01); *C09J 133/04* (2013.01); *C09J 133/14* (2013.01); *C09J 183/08* (2013.01)

(58) Field of Classification Search
    CPC ....... C09J 133/10; C09J 133/14; C09J 183/08
    See application file for complete search history.

(56) References Cited

U.S. PATENT DOCUMENTS

| | | | | |
|---|---|---|---|---|
| 4,619,990 A | * | 10/1986 | Elmasry | ................. C09B 69/10 |
| | | | | 430/270.14 |
| 2008/0220225 A1 | * | 9/2008 | Moon | .................... G02B 5/201 |
| | | | | 428/195.1 |
| 2009/0116249 A1 | * | 5/2009 | Cho | ........................ B29C 33/42 |
| | | | | 362/351 |
| 2016/0259104 A1 | * | 9/2016 | Lee | ...................... G02B 5/3083 |

FOREIGN PATENT DOCUMENTS

| | | | |
|---|---|---|---|
| JP | H10-168408 A | * | 6/1998 |
| JP | H10-168408 A | | 6/1998 |
| JP | 2008-138163 A | | 6/2008 |
| KR | 10-2014-0074581 A | | 6/2014 |
| KR | 10-1431869 B1 | | 8/2014 |
| KR | 10-1484338 B1 | | 1/2015 |
| WO | WO-2009/040317 A2 | * | 4/2009 |

* cited by examiner

*Primary Examiner* — Peter D. Mulcahy
(74) *Attorney, Agent, or Firm* — Lee & Morse, P.C.

(57) ABSTRACT

An adhesive including a copolymer that includes repeating units of a first monomer and a second monomer, wherein: the first monomer includes a (meth)acrylate-based monomer, a silicon-based monomer, or an urethane-based monomer, the second monomer includes a light absorbing group, and the light absorbing group is an azo-based dye.

6 Claims, 3 Drawing Sheets

LIGHT BLOCKING ADHESIVE AND DISPLAY DEVICE INCLUDING THE SAME

CROSS-REFERENCE TO RELATED APPLICATION

Korean Patent Application No. 10-2016-0068372, filed on Jun. 1, 2016, in the Korean Intellectual Property Office, and entitled: "Adhesive," is incorporated by reference herein in its entirety.

BACKGROUND

1. Field

Embodiments relate to a light blocking adhesive.

2. Description of the Related Art

Ultraviolet light and a part of visible light have energy with sufficient intensity for cleaving a molecular bond such as an organic compound. Accordingly, ultraviolet light and a part of visible light may be a factor of deteriorating the intensity and performance of various products.

SUMMARY

Embodiments are directed to a light blocking adhesive.

The embodiments may be realized by providing an adhesive comprising a copolymer that includes repeating units of a first monomer and a second monomer, wherein: the first monomer includes a (meth)acrylate-based monomer, a silicon-based monomer, or an urethane-based monomer, the second monomer includes a light absorbing group, and the light absorbing group is an azo-based dye.

The light absorbing group may have an absorption wavelength of about 380 nm to about 420 nm.

The second monomer may further include a copolymerizable functional group that is connected with the light absorbing group.

The copolymerizable functional group may include a (meth)acrylate group, a vinyl group, an isocyanate group, a hydroxyl group, a carboxyl group, an amino group, or a halogen group.

The second monomer may be represented by the following Formula 1:

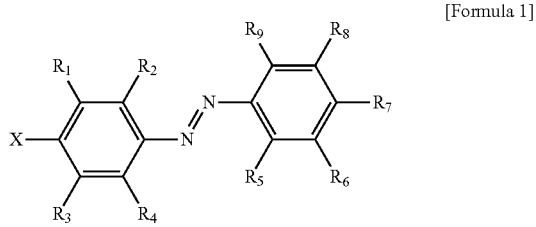

[Formula 1]

wherein, in Formula 1, X may be a (meth)acrylate group, a vinyl group, an isocyanate group, a hydroxyl group, a carboxyl group, an amino group, or a halogen group, and $R_1$ to $R_9$ may each independently be a hydrogen atom, a hydroxyl group, a nitro group, an alkyl group having 1 to 20 carbon atoms, an alkoxy group having 1 to 20 carbon atoms, or an amine group.

At least one of $R_2$, $R_4$, $R_5$, or $R_9$ may be a hydroxyl group.

The copolymer may include about 85 wt % to about 99 wt % of the repeating units of the first monomer, and about 1 wt % to about 15 wt % of the repeating units of the second monomer, based on a total weight of the copolymer.

A weight average molecular weight (Mw) of the copolymer may be about 100,000 to about 2,000,000.

The copolymer may be a random copolymer or a block copolymer.

The copolymer may be a graft copolymer that includes the repeating units of the first monomer in a main chain and the repeating units of the second monomer in a side chain.

The embodiments may be realized by providing a display device including the adhesive according to an embodiment.

BRIEF DESCRIPTION OF THE DRAWINGS

Features will be apparent to those of skill in the art by describing in detail exemplary embodiments with reference to the attached drawings in which.

DETAILED DESCRIPTION

Figure 1:
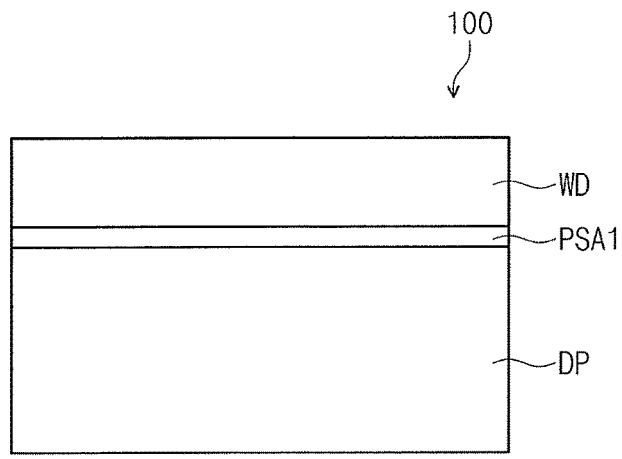
FIG. 1 illustrates a cross-sectional view of a display device according to an embodiment of the present disclosure.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

Like reference numerals refer to like elements for explaining each drawing. In the drawings, the sizes of elements may be enlarged for clarity of the present disclosure. It will be understood that, although the terms first, second, etc. may be used herein to describe various elements, these elements should not be limited by these terms. These terms are only used to distinguish one element from another element. For example, a first element discussed below could be termed a second element, and similarly, a second element could be termed a first element. As used herein, the singular forms are intended to include the plural forms as well, unless the context clearly indicates otherwise.

It will be further understood that the terms "comprises," "includes," "including," or "comprising," when used in this specification, specify the presence of stated features, numerals, steps, operations, elements, parts, or a combination thereof, but do not preclude the presence or addition of one or more other features, numerals, steps, operations, elements, parts, or a combination thereof It will also be understood that when a layer, a film, a region, a plate, etc. is referred to as being 'on' another part, it can be directly on the other part, or intervening layers may also be present. When a layer, a film, a region, a plate, etc. is referred to as being 'under' another part, it can be directly under the other part, or intervening layers may also be present. As used herein, the term "or" is not an exclusive term.

Hereinafter, exemplary embodiments of the adhesive according to an embodiment of the present disclosure will be described in detail.

The adhesive according to an embodiment of the present disclosure may include a copolymer including repeating units of a first monomer and repeating units of a second monomer.

The first monomer may include, e.g., a (meth)acrylate-based monomer, a silicon-based monomer, or a urethane-based monomer. In an implementation, the first monomer may be, e.g., the (meth)acrylate-based monomer. In an implementation, the (meth)acrylate-based monomer may be, e.g., an alkyl (meth)acrylate-based monomer. An alkyl moiety of the alkyl (meth)acrylate-based monomer may have 1 to 20 carbon atoms, e.g., 1 to 10 carbon atoms. In an implementation, the (meth)acrylate-based monomer may be, e.g., one of the following compounds or a derivative thereof.

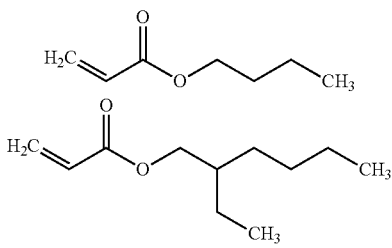

The first monomer may include two or more as described above, e.g., the first monomer may include a (meth)acrylate-based monomer and a urethane-based monomer. For example, the copolymer may include repeating units of two different first monomers. In this case, the adhesive may include a urethane (meth)acrylate-based polymer.

In the case where the first monomer includes the (meth)acrylate-based monomer, the first monomer may include a single or two or more (meth)acrylate-based monomers. In the case where the first monomer includes the silicon-based monomer, the first monomer may include a single or two or more silicon-based monomers. In the case where the first monomer includes the urethane-based monomer, the first monomer may include a single or two or more urethane-based monomers.

The first monomer may be polymerized via a polymerization reaction and may exhibit adhesiveness, and the second monomer may exhibit light absorption power or properties (e.g., may block or prevent certain wavelengths of light from being transmitted therethrough).

The second monomer may include a light absorbing group. The light absorbing group may be, e.g., an azo-based dye. The azo-based dye refers to a dye, compound, or moiety containing —N=N— in a molecule as a coloring terminal. For example, the second monomer may include an azo group or may be an azo compound. The azo-based dye may have a narrow half width and good molar extinction coefficient, and the control of light absorption in a specific wavelength region may be efficient and easy. The azo-based dye may have better light-resistance and heat-resistance than an ultraviolet light absorption dye (which may otherwise be used and may include, e.g., a benzophenone-based dye, a triazine-based dye, etc.). Accordingly, the adhesive according to an embodiment of the present disclosure may be favorably applied to a product that is susceptible to exposure to ultraviolet light. In an implementation, the azo-based dye may be easily synthesized when compared to a benzophenone-based dye, a triazine-based dye, etc. and may be favorable in consideration of cost.

The light absorbing group may absorb near-ultraviolet rays and a part of visible light region. The light absorbing group may have an absorption wavelength of, e.g., about 380 nm to about 420 nm. The light absorbing group may have a maximum absorption wavelength of, e.g., about 380 nm to about 420 nm. In an implementation, the light absorbing group may have an absorption wavelength of, e.g., about 400 nm to about 420 nm. In an implementation, the light absorbing group may have a maximum absorption wavelength of, e.g., about 400 nm to about 420 nm.

Ultraviolet light having a wavelength of less than about 380 nm may be blocked by various ultraviolet light absorbing agents. However, ultraviolet light near visible light or visible light having a wavelength of greater than about 380 nm may not be efficiently blocked. For example, light having a wavelength of about 400 nm or more may not be efficiently blocked. Accordingly, the adhesive according to an embodiment of the present disclosure may block near-ultraviolet rays in a wavelength region greater than about 380 nm and a part of visible light. In the case where the absorption wavelength of the light absorbing group is greater than about 420 nm, blue light would be absorbed and/or blocked. Accordingly, such a light absorbing group could be inadequate for a display device accomplishing full color.

The second monomer may further include a copolymerizable functional group that is connected with the light absorbing group. The copolymerizable functional group refers to a functional group that may react with the first monomer to form a bond. In an implementation, the copolymerizable functional group may include, e.g., a (meth)acrylate group, a vinyl group, an isocyanate group, a hydroxyl group, a carboxyl group, an amino group, or a halogen group.

The copolymerizable functional group and the first monomer may undergo a radical reaction, a condensation reaction, an addition reaction, or a substitution reaction. The kind of the reaction may depend on the kind of the copolymerizable functional group and/or the first monomer.

For example, in the case where the first monomer is a monomer derived from or includes butyl acrylate and the copolymerizable functional group is a (meth)acrylate group, the first monomer and the copolymerizable functional group may undergo a radical reaction. In an implementation, in the case where the first monomer is a monomer derived from or is hydroxyethyl methacrylate and the copolymerizable functional group is a hydroxyl group, the first monomer and the copolymerizable functional group may undergo a condensation reaction. In an implementation, in the case where the first monomer is a monomer derived from or is hydroxyethyl methacrylate and the copolymerizable functional group is an isocyanate group, the first monomer and the copolymerizable functional group may undergo a urethane reaction (addition reaction).

In an implementation, the second monomer may be a monomer derived from a compound represented by the following Formula 1 or may be represented by Formula 1.

[Formula 1]

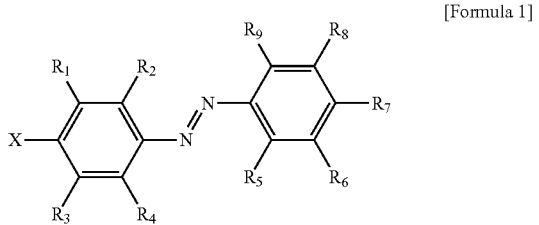

In Formula 1, X may be, e.g., a copolymerizable functional group. For example, X may be a (meth)acrylate group, a vinyl group, an isocyanate group, a hydroxyl group, a carboxyl group, an amino group, or a halogen group.

In Formula 1, $R_1$ to $R_9$ may each independently be, e.g., a hydrogen atom or an electron-donating group. In an implementation, $R_1$ to $R_9$ may each independently be, e.g., a hydrogen atom, a hydroxyl group, a nitro group, an alkyl group, an alkoxy group, or an amine group. In an implementation, a carbon number of the alkyl group may be from 1 to 30, e.g., 1 to 20. The alkyl group may be a substituted or unsubstituted alkyl group. In an implementation, the alkyl group may be a methyl group or an ethyl group. The amine group may be a substituted or unsubstituted amine group. In an implementation, the carbon number of the alkoxy group may be from 1 to 30, e.g., 1 to 20. In an implementation, the alkoxy group may be, e.g., an ethoxy group or a methoxy group.

In an implementation, at least one of $R_2$, $R_4$, $R_5$, and $R_9$ may be a hydroxyl group. In an implementation, all of $R_2$, $R_4$, $R_5$, and $R_9$ may be a hydroxyl group. In the case where a substituent positioned at an ortho position with respect to an azo group is a hydroxyl group, the azo group and the hydroxyl group may make an intramolecular hydrogen bond, thereby improving heat-resistance and light-resistance. For example, the heat-resistance and the light-resistance to visible light may be improved.

An azo group and a hydroxyl group may react and make, e.g., an intramolecular hydrogen bond as follows.

uct that uses the adhesive. Maintaining the amount of repeating units of the first monomer at about 85 wt % or greater may help ensure that sufficient adhesiveness is exhibited. Maintaining the amount of repeating units of the first monomer at about 99 wt % or less may help ensure that light absorption performance is sufficient.

In an implementation, the wt % of repeating units of the second monomer may be, e.g., about 10 wt %, based on the total weight of the copolymer (100 wt %).

In an implementation, the weight average molecular weight ($M_w$) of the copolymer may be from about 100,000 to about 2,000,000 (g/mol), e.g., from about 200,000 to about 2,000,000 (g/mol) or about 500,000 to about 1,500,000 (g/mol).

In the case where the weight average molecular weight ($M_w$) of the copolymer is from about 100,000 to about 2,000,000 (g/mol), adhesive properties of an adhesive may not be deteriorated, and the manufacture of a layer, a film, a sheet, etc. including the adhesive may be facilitated.

In an implementation, the copolymer may be a block copolymer or a random copolymer. In an implementation, the copolymer may be a graft copolymer. In the case where the copolymer is a graft copolymer, the main chain of the graft copolymer may include the repeating units of the first monomer and the side chain thereof may include the repeating units of the second monomer. In the case where the second monomer is included in the side chain, each side chain may be obtained by combining a plurality of the second monomers or the second monomer as a single molecule (e.g., one of the second monomer).

In the case where the copolymer is the graft copolymer, the copolymer may be prepared by graft polymerizing a macromer formed by polymerizing the first monomer with the second monomer. For example, in the case where a macromer obtained by polymerizing the first monomer includes a carboxyl group, and the copolymerizable functional group of the second monomer is a halogen group, a hydroxyl group or an amine group, a graft copolymer in which the copolymerizable functional group and the carboxyl group react to form a covalent bond may be formed.

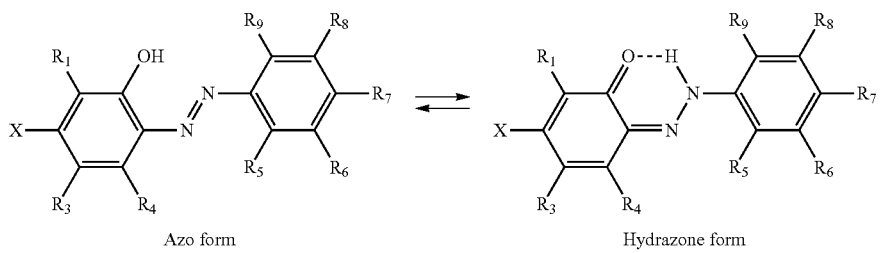

Azo form          Hydrazone form

In an implementation, $R_1$ to $R_9$ may be bilaterally symmetric with respect to the azo group.

In an implementation, the copolymer may include about 85 wt % to about 99 wt % of repeating units of the first monomer and about 1 wt % to about 15 wt % of repeating units of the second monomer, based on the total weight (100 wt %) of the copolymer. Maintaining the amount of repeating units of the second monomer at about 1 wt % or greater helps ensure that the light absorption effect is sufficient. Maintaining the amount of repeating units of the second monomer at about 15 wt % or less helps ensure that the light absorption performance may be improved and the transmittance of visible light is not deteriorated, thereby reducing the possibility of a yellowish phenomenon occurring in a prod- In an implementation, the copolymer may further include another monomer as a comonomer, e.g., in addition to the first monomer and the second monomer.

In an implementation, the adhesive according to an embodiment of the present disclosure may further include an additive in addition to the copolymer including the first monomer and the second monomer as desired. As the additive, a suitable additive to help control physical properties for the adhesive according to the use may be appropriately used. The additive may include, e.g., a heat stabilizer, a polymerization initiator, a crosslinking agent, a chain transferring agent, an oxidation preventing agent, a silane coupling agent, an antistatic agent, etc.

In an implementation, the adhesive according to an embodiment of the present disclosure may be an adhesive for a display device. For example, the adhesive according to an embodiment of the present disclosure may be disposed on an organic light emitting device of an organic light emitting display device. In an implementation, the adhesive according to an embodiment of the present disclosure may be used in a product requiring the blocking of ultraviolet light and a part of visible light.

In an implementation, the adhesive according to an embodiment of the present disclosure may have light transmittance of about 10% or less at about 400 nm, e.g., about 7% or less. In an implementation, the adhesive according to an embodiment of the present disclosure may have light transmittance of about 10% or less in a wavelength region of about 390 nm to about 410 nm, e.g., about 7% or less.

In order to impart an adhesive with an ultraviolet light blocking function, a dye (which is an ultraviolet light absorbing agent) could be dispersed in an adhesive polymer. However, the dye (which is an ultraviolet light absorbing agent) may have low solubility with respect to a solvent and may have low compatibility with other additives. Thus, the dye could be aggregated and could thus bleed out. The bleed out phenomenon of a dye could cause an increase of haze at a surface of the adhesive. In addition, in the case where the aggregation degree of the dye is severe, a product in which the adhesive is applied could become yellowish.

In the adhesive according to an embodiment of the present disclosure, a monomer including a light absorbing group may be copolymerized with an adhesive polymer, and the bleed out phenomenon of a light absorbing dye may be reduced and/or prevented. In addition, by using an azo-based dye having a narrow half width and a good molar extinction coefficient, target light in a specific wavelength region may be efficiently absorbed. In addition, the azo-based dye may have good light-resistance to visible light and heat-resistance, and the adhesive according to an embodiment of the present disclosure may be favorably applied to a product exposed to visible light. In an implementation, the adhesive according to an embodiment of the present disclosure may be applied to a display device, e.g., may be used as an adhesive provided on a display panel.

Hereinafter, a display device according to an embodiment of the present disclosure will be explained.

FIG. 1 illustrates a cross-sectional view of a display device according to an embodiment of the present disclosure.

The display device 100 according to an embodiment of the present disclosure may include the adhesive according to an embodiment of the present disclosure. Unexplained part on the adhesive will follow the above-described explanation.

Referring to FIG. 1, a display device 100 according to an embodiment of the present disclosure may include a display panel DP and a window WD disposed on the display panel DP. Between the display panel DP and the window WD, an adhesive layer PSA1 may be disposed, and the adhesive layer PSA1 may include the adhesive according to an embodiment of the present disclosure. For example, the adhesive layer PSA1 may include a copolymer including repeating units of at least one first monomer (including, e.g., a (meth)acrylate-based monomer, a silicon-based monomer, or a urethane-based monomer) and repeating units of a second monomer including a light absorbing group (e.g., the light absorbing group being or including an azo-based dye).

In an implementation, the adhesive layer PSA1 may contact the display panel DP. In an implementation, another element may be disposed between the display panel DP and the adhesive layer PSA1.

The adhesive layer PSA1 may play a role of restraining deterioration of the display panel DP due to ultraviolet light and a part of visible light by blocking ultraviolet light and a part of visible light. Accordingly, the particular position of the adhesive layer PSA1 including the adhesive according to an embodiment of the present disclosure may not be limited only if disposed on the display panel DP.

The display panel DP may be an organic light emitting display panel, a liquid crystal display panel, a plasma display panel, an electrophoretic display panel, a microelectromechanical system (MEMS) display panel, or an electrowetting display panel.

The display panel DP may be, e.g., an organic light emitting display panel. The organic light emitting display panel may include a plurality of organic layers, and the organic layer could be easily deteriorated due to ultraviolet light and a part of visible light generated or incident from outside. On the display panel DP, the adhesive layer PSA1 (including the adhesive according to an embodiment of the present disclosure) may be provided to help restrain or prevent the deterioration of an organic layer included in the display panel DP.

In an implementation, the adhesive layer PSA1 may have a sheet shape. In an implementation, the adhesive layer PSA1 may be a double-sided adhesive layer. In an implementation, the adhesive layer PSA1 may be a pressure sensitive adhesive (PSA) layer.

Figure 2:
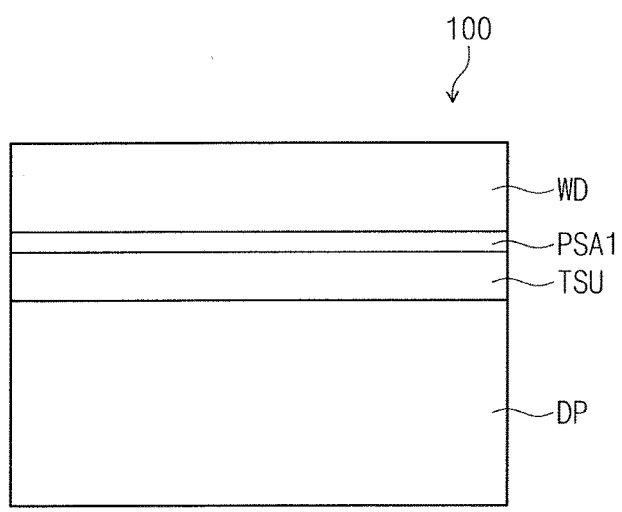
FIG. 2 illustrates a cross-sectional view of a display device according to an embodiment of the present disclosure.

FIG. 2 illustrates a cross-sectional view of a display device according to an embodiment of the present disclosure.

Referring to FIG. 2, a display device 100 according to an embodiment of the present disclosure may further include a touch sensing unit TSU disposed between a display panel DP and a window WD. The touch sensing unit TSU may contact the display panel DP. In an implementation, the touch sensing unit TSU may be deposited on the display panel DP without forming an adhesive layer.

An adhesive layer PSA1 may be disposed between the touch sensing unit TSU and the window WD.

Figure 3:
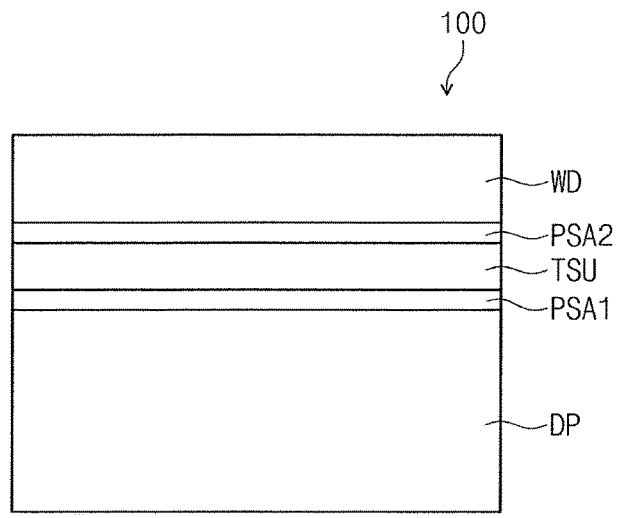
FIG. 3 illustrates a cross-sectional view of a display device according to an embodiment of the present disclosure.

FIG. 3 illustrates a cross-sectional view of a display device according to an embodiment of the present disclosure.

Referring to FIG. 3, a plurality of adhesive layers PSA1 and PSA2 may be included in a display panel 100 according to an embodiment of the present disclosure. In this case, at least one of the pluralities of the adhesive layers PSA1 and PSA2 may include the adhesive according to an embodiment of the present disclosure. For example, the adhesive layer may include a first adhesive layer PSA1 disposed between a display panel DP and a touch sensing unit TSU and a second adhesive layer PSA2 disposed between the touch sensing unit TSU and a window WD. At least one of the first adhesive layer PSA1 and the second adhesive layer PSA2 may include the adhesive according to an embodiment of the present disclosure.

Figure 4:
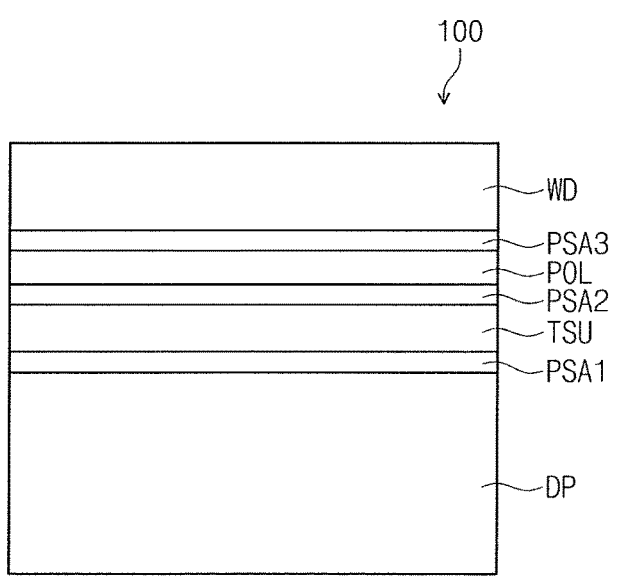
FIG. 4 illustrates a cross-sectional view of a display device according to an embodiment of the present disclosure.

FIG. 4 illustrates a cross-sectional view of a display device according to an embodiment of the present disclosure.

Referring to FIG. 4, a display device 100 according to an embodiment of the present disclosure may further include a polarization member POL disposed between a touch sensing unit TSU and a window WD. An adhesive layer may further include a third adhesive layer PSA3 disposed between the polarization member POL and the window WD in addition to a first adhesive layer PSA1 and a second adhesive layer PSA2. In this case, the second adhesive layer PSA2 may be disposed between the touch sensing unit TSU and the polarization member POL. At least one of the first adhesive layer PSA1, the second adhesive layer PSA2, and the third adhesive layer PSA3 may include the adhesive according to an embodiment of the present disclosure.

Figure 5:
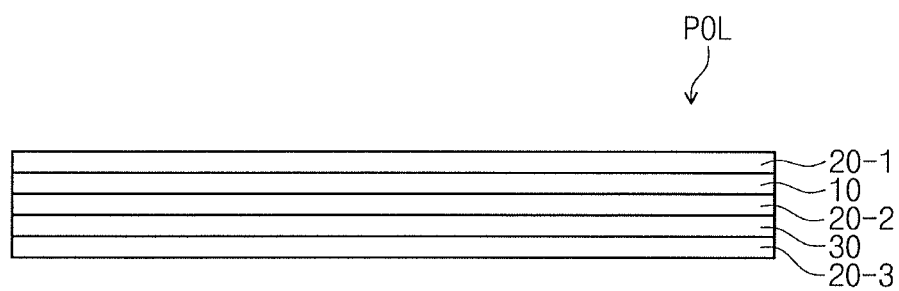
FIG. 5 illustrates a cross-sectional view of a display device according to an embodiment of the present disclosure.

FIG. 5 illustrates a cross-sectional view of a display device according to an embodiment of the present disclosure.

Referring to FIG. 5, a polarization member POL may include a polarizer 10 and a plurality of functional layers 20-1, 20-2, and 20-3. For example, the polarization member POL may include a first protection film 20-1 disposed on the polarizer 10 and a second protection film 20-2 disposed under the polarizer 10. The polarization member POL may further include a phase difference layer 20-3 disposed under the second protection film 20-2, and a sub adhesive layer 30 may be disposed between the second protection film 20-2 and the phase difference layer 20-3. An adhesive layer including the adhesive according to an embodiment of the present disclosure (PSA1 in FIG. 1) may be the sub adhesive layer 30 included in the polarization member POL.

Each of the above-described display panel DP, window WD, touch sensing unit TSU, and polarization member POL may employ a suitable element, and the display device 100 according to an embodiment of the present disclosure may additionally include other suitable elements as desired.

In the display device 100 according to an embodiment of the present disclosure, an adhesive layer including the adhesive according to an embodiment of the present disclosure (e.g., PSA1 in FIG. 1) may be disposed on the display panel DP so as to effectively block ultraviolet light and a part of visible light generated or incident from outside. For example, a bleed out phenomenon of a dye which absorbs light may be prevented, defects of a display device due to the increase of haze of an adhesive layer may be prevented, and the yellowing phenomenon of the display device 100 may be minimized by preventing the aggregation of a dye in the adhesive layer. In addition, by applying an azo-based dye as the dye for absorbing light, target light in a specific wavelength region may be effectively blocked, and decomposition of the dye may be minimized even the display device 100 is exposed to ultraviolet light.

By way of summation and review, in order to block ultraviolet light and a part of visible light, a product obtained by applying an adhesive obtained by mixing an additive such as a sunscreen have been considered.

The embodiments may provide an adhesive blocking ultraviolet light and a part of visible light.

The embodiments may provide an adhesive that may help decrease bleed out phenomenon of a dye that blocks ultraviolet light and a part of visible light, and may efficiently block light having a specific wavelength at the same time.

The adhesive according to an embodiment of the present disclosure may include an adhesive copolymer including a dye as a monomer (and repeating unit), which is capable of blocking ultraviolet light and a part of visible light. A bleed out phenomenon of the dye which is capable of blocking ultraviolet light and a part of visible light may be prevented.

By using the adhesive according to an embodiment of the present disclosure, heat-resistance and light-resistance may be good and the blocking function of ultraviolet light and a part of visible light may be maintained at the same time.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. An adhesive comprising a copolymer that includes repeating units of a first monomer and a second monomer, wherein:
the first monomer includes a (meth)acrylate group-containing monomer, a silicon-containing monomer, or a urethane group-containing monomer,
the second monomer is represented by the following Formula 1:

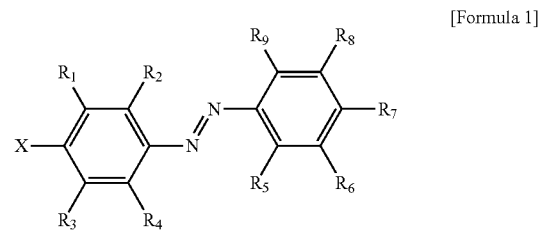

[Formula 1]

wherein, in Formula 1,
X is a (meth)acrylate group, a vinyl group, an isocyanate group, a hydroxyl group, a carboxyl group, an amino group, or a halogen group, and
$R_1$ to $R_9$ are each independently a hydrogen atom, a hydroxyl group, a nitro group, an alkyl group having 1 to 20 carbon atoms, an alkoxy group having 1 to 20 carbon atoms, or an amine group, at least one of $R_2$, $R_4$, $R_5$, or $R_9$ being a hydroxyl group.

2. The adhesive as claimed in claim 1, wherein the copolymer includes:
about 85 wt % to about 99 wt % of the repeating units of the first monomer, and
about 1 wt % to about 15 wt % of the repeating units of the second monomer, based on a total weight of the copolymer.

3. The adhesive as claimed in claim 1, wherein a weight average molecular weight (Mw) of the copolymer is about 100,000 to about 2,000,000.

4. The adhesive as claimed in claim 1, wherein the copolymer is a random copolymer or a block copolymer.

5. The adhesive as claimed in claim 1, wherein the copolymer is a graft copolymer that includes the repeating units of the first monomer in a main chain and the repeating units of the second monomer in a side chain.

6. A display device including the adhesive as claimed in claim 1.

* * * * *